(12) United States Patent
Chu

(10) Patent No.: US 8,874,087 B2
(45) Date of Patent: Oct. 28, 2014

(54) INITIATING COMMUNICATION FROM A MOBILE TERMINAL BY USING A SELECTED SHORTCUT NUMBER

(75) Inventor: Se-Youp Chu, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 30 days.

(21) Appl. No.: 12/902,468

(22) Filed: Oct. 12, 2010

(65) Prior Publication Data

US 2011/0086622 A1    Apr. 14, 2011

(30) Foreign Application Priority Data

Oct. 13, 2009    (KR) .................. 10-2009-0097222

(51) Int. Cl.
  *H04M 11/10*    (2006.01)
  *H04M 1/2745*    (2006.01)
(52) U.S. Cl.
  CPC ............. *H04M 1/274558* (2013.01); *H04M 2001/274541* (2013.01)
  USPC ............. 455/414.1; 455/564; 379/216.01; 379/355.01; 379/355.02; 379/355.06; 379/355.09
(58) Field of Classification Search
  USPC ............................. 455/414.1, 564
  See application file for complete search history.

(56) References Cited

U.S. PATENT DOCUMENTS

| | | | |
|---|---|---|---|
| 6,243,459 B1 * | 6/2001 | Cannon et al. ........... | 379/356.01 |
| 7,738,912 B1 * | 6/2010 | Hawkins et al. ............. | 455/564 |
| 2002/0034168 A1 * | 3/2002 | Swartz et al. ................. | 370/329 |
| 2002/0052196 A1 * | 5/2002 | Padawer et al. ............... | 455/414 |
| 2004/0052355 A1 * | 3/2004 | Awada et al. ............ | 379/355.01 |
| 2004/0203610 A1 * | 10/2004 | Deeds ............................ | 455/564 |
| 2005/0197163 A1 * | 9/2005 | Lee et al. ...................... | 455/564 |
| 2007/0004459 A1 * | 1/2007 | Aarnio .......................... | 455/564 |
| 2008/0079609 A1 * | 4/2008 | Kallqvist ........................ | 341/22 |
| 2009/0111435 A1 * | 4/2009 | Tsuei ............................. | 455/566 |
| 2009/0303199 A1 * | 12/2009 | Cho et al. ...................... | 455/566 |

FOREIGN PATENT DOCUMENTS

| | | | |
|---|---|---|---|
| EP | 491516 A2 | * | 6/1992 |
| EP | 1 193 956 A2 | | 4/2002 |
| EP | 1 718 046 A1 | | 11/2006 |

* cited by examiner

*Primary Examiner* — Charles Appiah
*Assistant Examiner* — Randy Peaches
(74) *Attorney, Agent, or Firm* — Jefferson IP Law, LLP

(57) ABSTRACT

A method for initiating a communication in a mobile terminal, and a mobile terminal apparatus to perform the method, are provided. The method includes determining whether the mobile terminal has entered a shortcut mode, if the mobile terminal has entered the shortcut mode, searching a phone book for shortcut numbers, which consist of a predefined number of digits and start with an input number, obtaining phone book information corresponding to the shortcut numbers that were found in the phone book and displaying the shortcut numbers and their associated phone book information, and if any one of the displayed shortcut numbers and their associated phone book information is selected, initiating a communication using the selected phone book information or shortcut number.

20 Claims, 4 Drawing Sheets

INITIATING COMMUNICATION FROM A MOBILE TERMINAL BY USING A SELECTED SHORTCUT NUMBER

PRIORITY

This application claims the benefit under 35 U.S.C. §119 (a) of a Korean patent application filed in the Korean Intellectual Property Office on Oct. 13, 2009 and assigned Serial No. 10-2009-0097222, the entire disclosure of which is hereby incorporated by reference.

BACKGROUND OF THE INVENTION

1. Field of the Invention

The present invention relates to a method for initiating communication in a mobile terminal. More particularly, the present invention relates to a method for quickly initiating a communication connection in a mobile terminal.

2. Description of the Related Art

Generally, a mobile terminal refers to an advanced communication device with which a user can make a call or exchange data while on the move. With the popularization of such mobile terminals, users prefer to communicate using mobile terminals rather than wired telephones.

To initiate communication using a mobile terminal, a user needs to input contact information, such as a phone number, of a communication counterpart. Generally, a user of a mobile terminal stores registration information (e.g., names and phone numbers) of communication counterparts in a phone book of the mobile terminal. Accordingly, for many users, the phone book is an indispensable feature of a mobile terminal.

Meanwhile, the increasing use of a mobile terminal may cause frequent use of a phone book, and possibly increase the number of communication counterparts registered in the phone book, which makes it difficult for the user to select a specific communication counterpart to initiate a communication connection (e.g., an outgoing call). There is a conventional method that addresses such problems in which unique shortcut numbers (or hot keys) are assigned to respective communication counterparts so that a user may easily initiate communication with a desired communication counterpart corresponding to a specific shortcut number by simply inputting the shortcut number.

Although the conventional method described above may enable rapid communication through speed dialing, if an increasing number of communication counterparts are registered in relation to shortcut numbers, a user may have difficulty in memorizing all the registered communication counterparts.

For example, a user may memorize, without difficulty, communication counterparts registered in relation to single-digit shortcut numbers (e.g., 0 to 9), so the user can conveniently initiate communication using the shortcut numbers. However, in the case of multi-digit shortcut numbers, it may be quite difficult for a user to memorize all the communication counterparts registered in relation to the shortcut numbers, so the user ends up searching a phone book for a specific communication counterpart by inputting a name or phone number of the communication counterpart, to initiate communication.

Therefore, there is a need for a method for quickly initiating a communication without having to input names or phone numbers of communication counterparts, even though the communication counterparts are registered in relation to multi-digit shortcut numbers.

SUMMARY OF THE INVENTION

An aspect of the present invention is to address at least the above-mentioned problems and/or disadvantages and to provide at least the advantages described below. Accordingly, an aspect of the present invention is to provide a method for quickly initiating a communication by allowing a user to easily check and select communication counterparts registered in relation to multi-digit shortcut numbers.

In accordance with an aspect of the present invention, a method for initiating a communication in a mobile terminal is provided. The method includes determining whether the mobile terminal has entered a shortcut mode, if the mobile terminal has entered the shortcut mode, searching a phone book for shortcut numbers, which consist of a predefined number of digits and start with an input number, obtaining phone book information corresponding to the shortcut numbers that were found in the phone book and displaying the shortcut numbers and their associated phone book information, and if any one of the displayed shortcut numbers and their associated phone book information is selected, initiating a communication using the selected phone book information or shortcut number.

In accordance with another aspect of the present invention, a mobile terminal apparatus for initiating a communication is provided. The apparatus comprises a display for displaying information to a user, an input unit for receiving input from the user, a memory for storing a phone book, and a controller. The controller controls to determine whether a shortcut mode has been entered, if the shortcut mode has been entered, controls to search the phone book for shortcut numbers, which consist of a predefined number of digits and start with an input number, controls to obtain phone book information corresponding to the shortcut numbers that were found in the phone book, controls to display the shortcut numbers and their associated phone book information on the display, if any one of the displayed shortcut numbers and their associated phone book information is selected via the input unit, and controls to initiate a communication using the selected phone book information or shortcut number.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
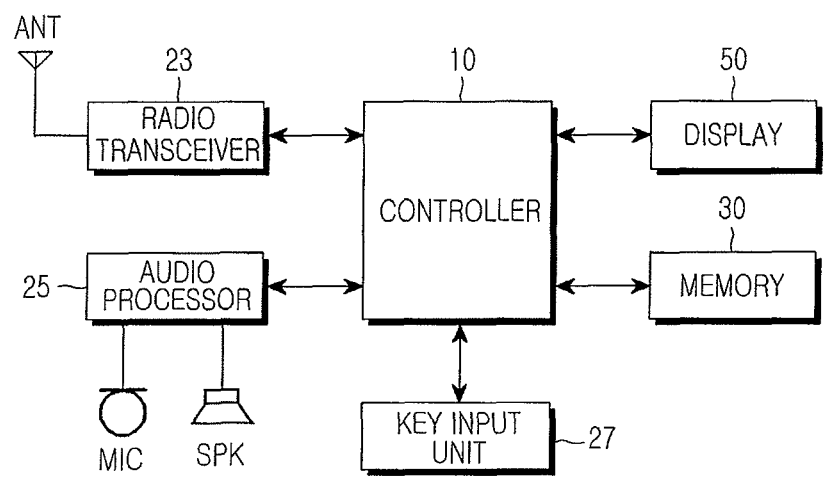
FIG. 1 is a block diagram of a mobile terminal according to an exemplary embodiment of the present invention.

FIG. 1 is a block diagram of a mobile terminal according to an exemplary embodiment of the present.

A key input unit 27 includes alphanumeric keys for inputting numeric and character information and function keys for setting various functions.

A radio transceiver 23 performs a radio communication function of the mobile terminal, and includes a Radio Frequency (RF) unit and a modulator-demodulator (modem). The RF unit includes an RF transmitter for frequency-upconverting and amplifying a signal to be transmitted, and includes an RF receiver for low-noise amplifying a received signal and frequency-down-converting the received signal. The modem includes a transmitter for encoding and modulating a signal to be transmitted, and includes a receiver for demodulating and decoding a signal received from the RF unit.

An audio processor 25 may constitute a codec, which includes a data codec and an audio codec. The data codec processes packet data, while the audio codec processes audio signals such as voice and multimedia files. The audio processor 25 converts digital audio signals provided from the modem into analog signals by means of the audio codec to reproduce the audio signals by a speaker SPK. The audio processor 25 also converts analog audio signals picked up by a microphone MIC into digital audio signals through the audio codec to transmit the converted digital audio signal to the modem. The codec may be independently provided or may be included in a controller 10.

A memory 30 includes a Read Only Memory (ROM) and a Random Access Memory (RAM). The memory 30 may be comprised of a program memory and a data memory, and may store programs for controlling an operation of the mobile terminal and data for booting up the mobile terminal.

According to the exemplary embodiment of the present invention, the memory 30 may store a phone book in which phone book information (or registration information) about communication counterparts is registered. The phone book information may include names, telephone numbers, birthdays, email addresses, messenger IDs, etc. of associated communication counterparts. In this case, a phone book address in the phone book is allocated to each communication counterpart. The allocated phone book address (e.g., one of 1 to 999) is used as a shortcut number to initiate communication (e.g., an outgoing call) with its associated communication counterpart.

The display 50 displays video signals and user data on a display screen, or displays data related to a phone call. The display 50 may be comprised of a Liquid Crystal Display (LCD), an Organic Light Emitting Diode (OLED), or an Active Matrix Organic Light Emitting Diode (AMOLED). When the LCD, OLED, or AMOLED is embodied in a touch screen, the display 50, together with the key input unit 27, may function as an input unit for controlling the mobile terminal. In this case, therefore, the display 50 according to the exemplary embodiment of the present invention may include a touch screen, and may serve as an input unit for controlling the mobile terminal, together with the key input unit 27. Hence, a numeric input operation by alphanumeric keys may be performed through either or both of the key input unit 27 and the display 50 with the touch screen.

The controller 10 controls overall operations of the mobile terminal. According to an exemplary embodiment of the present invention, in a shortcut mode, the controller 10 searches the phone book for shortcut numbers consisting of a prescribed number of digits and starting with an input number, acquires phone book information corresponding to the searched shortcut numbers, displays the acquired phone book information, and controls the mobile terminal to initiate communication if one of the shortcut numbers corresponding to the displayed phone book information is selected by the user.

Figure 2:
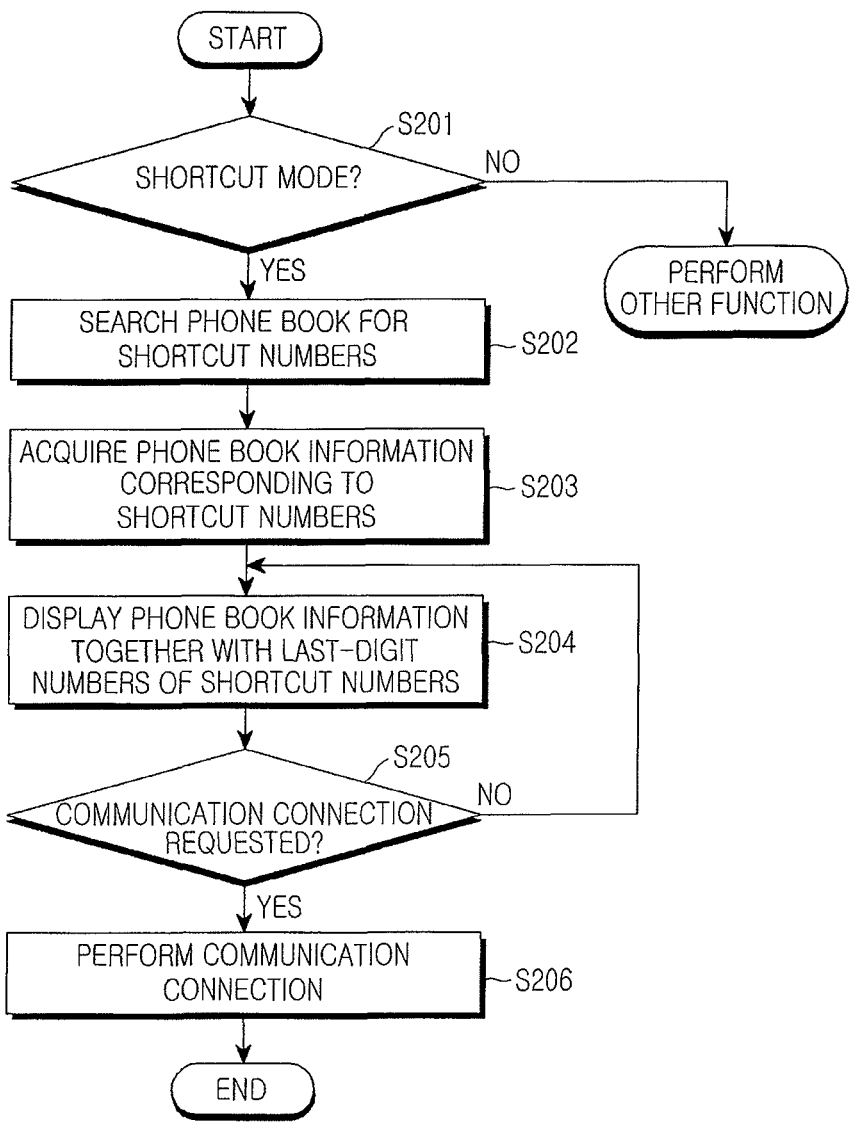
FIG. 2 is a flowchart illustrating a process for initiating communication in a mobile terminal according to an exemplary embodiment of the present invention.
Figure 3:
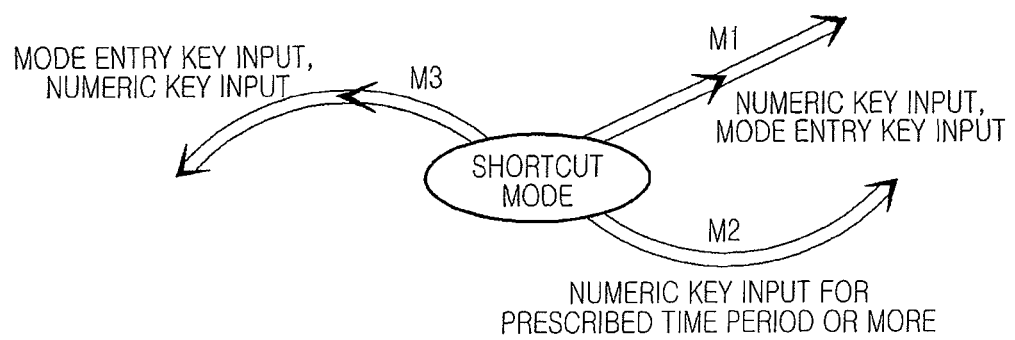
FIG. 3 is a diagram illustrating examples of a shortcut mode according to an exemplary embodiment of the present invention.
Figure 4:
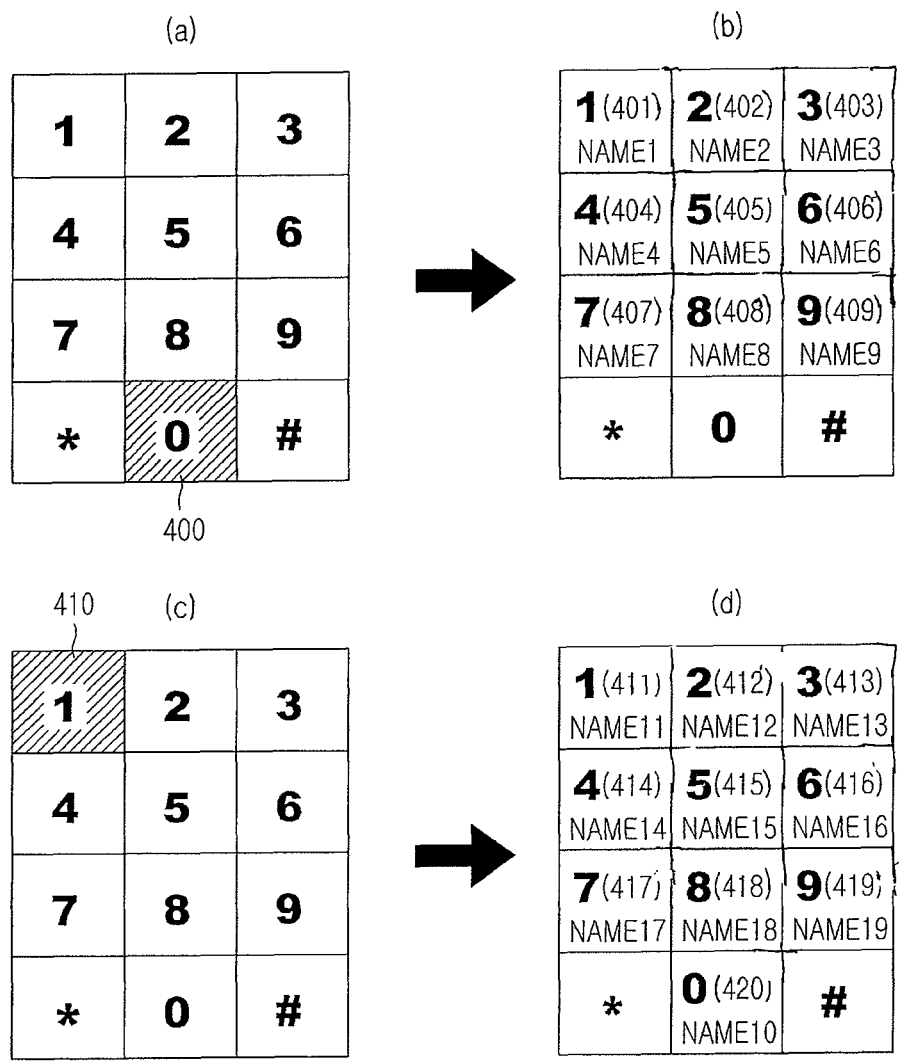
FIG. 4 includes diagrams illustrating examples of shortcut numbers and their associated phone book information according to an exemplary embodiment of the present invention.

FIG. 2 is a flowchart illustrating a process for initiating communication in a mobile terminal according to an exemplary embodiment of the present invention. FIG. 3 is a diagram illustrating examples of a shortcut mode according to an exemplary embodiment of the present invention. FIG. 4 includes diagrams illustrating examples of shortcut numbers and their associated phone book information according to an exemplary embodiment of the present invention. An exemplary embodiment of the present invention will now be described with reference to FIGS. 2 to 4.

Referring to FIG. 2, the controller 10 determines whether the mobile terminal has entered a shortcut mode in step S201.

The term "shortcut mode" as used herein refers to a communication mode (e.g., a speed dial mode) in which communication (e.g., an outgoing call) can be performed through the minimum key input. Three possible examples of the shortcut mode are illustrated in FIG. 3.

Referring to FIG. 3, in a first example M1, entry to the shortcut mode is made, if a numeric key is input after a prescribed key (e.g., a mode entry key) assigned to enter the shortcut mode is input. For example, if a user inputs a numeric key "0" indicated by reference numeral 400 in diagram (a) of FIG. 4 after inputting the mode entry key, the controller 10 determines that the mobile terminal has entered the shortcut mode and simultaneously determines that a number "0" has been input. In the case of M1, the controller 10 may determine whether the mobile terminal has entered the shortcut mode by simply determining whether the mode entry key has been input.

In a second example M2, entry to the shortcut mode is made, if a specific numeric key has been input for a prescribed time period or more. In the conventional method, inputting a specific key for a prescribed time period or more (e.g., a long-key function) serves as speed dialing. However, in the exemplary embodiment of the present invention, such long-key input is used to determine whether the mobile terminal has entered the shortcut mode. For example, if a user inputs the numeric key "0" indicated by reference numeral 400 in diagram (a) of FIG. 4 for a prescribed time period or more, the controller 10 determines that the mobile terminal has entered the shortcut mode and simultaneously determines that a number "0" has been input.

In a third example M3, entry to the shortcut mode is made, if the mode entry key is input after a specific numeric key is input. For example, if a user inputs the mode entry key after inputting the numeric key "0" as indicated by reference numeral 400 in diagram (a) of FIG. 4, the controller 10 determines that the mobile terminal has entered the shortcut mode and simultaneously determines that a number "0" has been input.

Referring back to FIG. 2, if it is determined in step S201 that the mobile terminal has not entered the shortcut mode, the controller performs another function. Otherwise, if it is determined in step S201 that the mobile terminal has entered the shortcut mode, the controller 10 searches a phone book for shortcut numbers (or addresses) consisting of a prescribed number of digits and starting with a number of an input numeric key in step S202. The controller 10 acquires phone book information corresponding to the shortcut numbers found in the phone book in step S203, and displays the acquired phone book information together with the last-digit numbers of the searched shortcut numbers in step S204. The shortcut numbers refer to numbers corresponding to phone book addresses where registration information of communication counterparts registered in the phone book is stored. Namely, a communication counterpart registered in an address "1" of the phone book has a shortcut number of "1".

More specifically, as shown in diagram (a) of FIG. 4, if it is determined that the mobile terminal has entered the shortcut mode and the numeric key "0" has been input by the user, the controller 10 searches for shortcut numbers (e.g., "01" to "09") consisting of a prescribed number of digits (e.g., two digits) and starting with "0", which is the input numeric key. Next, the controller 10 analyzes phone book information of communication counterparts registered in addresses "1" to "9" corresponding to the found shortcut numbers, and displays, as indicated by reference numerals 401 to 409, the last-digit numbers of the shortcut numbers and their associated phone book information on the display 50 as illustrated in diagram (b) of FIG. 4. Although the shortcut numbers (or addresses) of "01" to "09" have two digits, it is assumed that "0" is considered null and thus they are processed as "1" to "9".

Referring to diagram (b) of FIG. 4, the controller 10 displays the shortcut numbers and their associated phone book information corresponding to the shortcut numbers by grouping them. More specifically, the controller 10 displays the last-digit numbers (or numeric keys) of the short numbers and their associated phonebook information (e.g., communication counterparts' names). For example, the controller 10 may extract a communication counterpart's name (e.g., Name 1) from phone book information corresponding to a shortcut number "01" (in actuality "1"), and display the last-digit number (or numeric key) "1" of the shortcut number "01" together with the extracted communication counterpart's name. Then the user can easily identify the name (Name 1) of the communication counterpart registered in relation to the shortcut number "1".

Diagrams (c) and (d) of FIG. 4 illustrate an example of two-digit shortcut numbers, such as "11" to "19", which start with an input number "1". If it is determined that the mobile terminal has entered the shortcut mode and a number "1" has been input by a user as indicated by reference numeral 410, the controller 10 displays phone book information corresponding to the two-digit shortcut numbers "10" to "19" starting with "1" as illustrated in diagram (d) of FIG. 4. Namely, if a user inputs the number "1", the controller 10 displays, as indicated by reference numerals 411 to 420, the last-digit numbers of the shortcut numbers "10" to "19" and their associated phone book information (e.g., communication counterparts' names 'Name 10' to 'Name 19'). For example, phonebook information (e.g., a communication counterpart's name such as Name 10) corresponding to a shortcut number "10" is displayed together with a numeric key "0" which is the last-digit number of the shortcut number "10" as indicated by reference numeral 420. Similarly, phonebook information (e.g., a communication counterpart's name 'Name 15') corresponding to a shortcut number "15" is displayed together with a numeric key "5" which is the last-digit number of the shortcut number "15".

The phone book information displayed in step S204 may be information about communication counterparts, such as telephone numbers, Email addresses, messenger IDs of communication counterparts, etc., in addition to the names (Name 1 to Name 9 and Name 10 to Name 19) of the communication counterparts.

Referring back to FIG. 2, the controller 10 determines in step S205 whether the user requests communication connection to the displayed phone book information. If it is determined that a communication connection is not requested, the process returns to step S204. Otherwise, if it is determined that a communication connection is requested, the controller 10 initiates a communication connection using the phone book information selected by the user in step S206.

More specifically, if names of communication counterparts are displayed through steps S201 to S204, the user can identify communication counterparts allocated to respective shortcut numbers and may request a communication connection (e.g., an outgoing call) by selecting specific phone book information (e.g., a name of a desired communication counterpart) or a shortcut number corresponding to specific phone book information.

For example, assuming that shortcut numbers and their associated phone book information are displayed on the display 50 as illustrated in diagram (d) of FIG. 4, if the user selects phone book information (e.g., Name 15) corresponding to a shortcut number "15", that is, if the user selects a region indicated by reference numeral 415 on the touch screen or has input a number "5" for a prescribed time period or more through the key input unit 27, then the controller 10 determines that the user has requested a communication connection to a communication counterpart registered in relation to the shortcut number "15".

Then, the controller 10 reads a telephone number registered in relation to the phone book information (e.g., Name 15) and performs an outgoing call to the telephone number.

According to another exemplary embodiment of the present invention, if it is determined that a communication connection is requested, the controller 10 may analyze the associated phone book information, display communication types (e.g., outgoing call/messenger service/Email service/video call, etc.), and initiate a communication connection according to the user selection. For example, the controller 10 may analyze phone book information corresponding to the shortcut number "15" and determine whether the phone book information includes a telephone number, a messenger ID, an Email ID, etc. The controller 10 may display an outgoing call menu based on the telephone number, a message connection menu based on the messenger ID, and an Email send menu based on the Email address. The controller 10 may perform an outgoing call, a messenger application, or an Email send application according to the user selection.

The exemplary embodiment of the present invention described with reference to FIGS. 2 to 4 has considered two-digit shortcut numbers, by way of example. However, the present invention is not limited to the two-digit shortcut numbers. Instead, exemplary embodiments of the present invention are applicable to shortcut numbers consisting of three digits or more.

For example, assuming that shortcut numbers consist of three digits (e.g., "120" to "129") and the mobile terminal has entered the shortcut mode according to the example M1 in FIG. 3, if a user inputs a number "12" after inputting the mode entry key, the shortcut numbers "120" to "129" starting with the input number "12" and their associated phonebook information will be displayed in a manner that is similar to the examples shown in diagrams (b) and (d) of FIG. 4. When the mobile terminal has entered the shortcut mode according to the example M2 in FIG. 3, if the user inputs a number "1" and then a number "2" for a prescribed time period or more, the shortcut numbers "120" to "129" starting with the number "12" and their associated phonebook information will be displayed in a manner that is similar to the examples shown in diagrams (b) and (d) of FIG. 4. When the mobile terminal has entered the shortcut mode according to the example M3 in FIG. 3, if a user inputs a number "12" and then inputs the mode entry key, the shortcut numbers "120" to "129" starting with the number "12" and their associated phonebook information will be displayed in a manner that is similar to the examples shown in diagrams (b) and (d) of FIG. 4. Thereafter, if the user requests a communication connection to any one of the three-digit shortcut numbers, the controller 10 initiates a communication connection as described above.

According to the exemplary embodiments of the present invention, communication counterparts registered in relation to shortcut numbers can be easily identified, facilitating rapid communication.

While the invention has been shown and described with reference to certain exemplary embodiments thereof, it will be understood by those skilled in the art that various changes in form and details may be made therein without departing from the scope and spirit of the invention as defined by the appended claims and their equivalents.

What is claimed is:

1. A method for initiating a communication in a mobile terminal, the method comprising:
    determining whether the mobile terminal has entered a shortcut mode;
    if the mobile terminal has entered the shortcut mode, searching a phone book for shortcut numbers, which consist of a predefined number of digits that is more than one and start with an input number;
    obtaining phone book information corresponding to the shortcut numbers that were found in the phone book, associating a subset of the shortcut numbers based on a first digit of the shortcut number, and displaying the shortcut numbers and their associated phone book information alongside the corresponding digit from 0-9 on the dial pad to which the shortcut number is associated; and
    if any one of the displayed shortcut numbers and their associated phone book information is selected, initiating a communication using the selected phone book information or shortcut number.

2. The method of claim 1, wherein the determining of whether the mobile terminal has entered the shortcut mode comprises determining whether a mode entry key to enter the shortcut mode is input.

3. The method of claim 1, wherein the determining of whether the mobile terminal has entered the shortcut mode comprises determining whether the input number has been input for a time period greater than or equal to a first prescribed threshold.

4. The method of claim 1, wherein the determining of whether the mobile terminal has entered the shortcut mode comprises determining whether a mode entry key to enter the shortcut mode is input after the input number is input.

5. The method of claim 1, wherein each of the shortcut numbers includes two or more digits.

6. The method of claim 1, wherein the initiating of the communication comprises initiating an outgoing call to a telephone number registered in relation to the selected phone book information or shortcut number.

7. The method of claim 1, wherein the initiating of the communication comprises displaying available communication types by analyzing the phone book information, and initiating the communication using a selected communication type from among the displayed communication types.

8. The method of claim 1, wherein the displaying of the shortcut numbers comprises grouping the obtained phone book information and last-digit numbers of their associated shortcut numbers.

9. A mobile terminal apparatus for initiating a communication, the apparatus comprising:
    a display for displaying information to a user;
    an input unit for receiving input from the user;
    a memory for storing a phone book; and
    a controller for controlling to determine whether a shortcut mode has been entered, if the shortcut mode has been entered, for controlling to search the phone book for shortcut numbers, which consist of a predefined number of digits that is more than one and start with an input number, for controlling to obtain phone book information corresponding to the shortcut numbers that were found in the phone book, for controlling to associate a subset of the shortcut numbers based on first digit of the shortcut number, for controlling to display the shortcut numbers and their associated phone book information alongside the corresponding digit from 0-9 on the dial pad to which the shortcut number is associated on the display, and, if any one of the displayed shortcut numbers and their associated phone book information is selected via the input unit, for controlling to initiate a communication using the selected phone book information or shortcut number.

10. The apparatus of claim 9, wherein the controller, when controlling to determine whether a shortcut mode has been entered, controls to determine whether a mode entry key to enter the shortcut mode is input via the input unit.

11. The apparatus of claim 9, wherein the controller, when controlling to determine whether a shortcut mode has been entered, controls to determine whether the input number has been input via the input unit for a time period greater than or equal to a first prescribed threshold.

12. The apparatus of claim 9, wherein the controller, when controlling to determine whether a shortcut mode has been entered, controls to determine whether a mode entry key to enter the shortcut mode is input via the input unit after the input number is input via the input unit.

13. The apparatus of claim 9, wherein each of the shortcut numbers includes two or more digits.

14. The apparatus of claim 9, wherein the controller, when controlling to initiate the communication, controls to initiate an outgoing call to a telephone number registered in relation to the selected phone book information or shortcut number.

15. The apparatus of claim 9, wherein the controller, when controlling to initiate the communication, controls to display available communication types on the display by analyzing the phone book information, and initiates the communication using a selected communication type from among the displayed communication types.

16. The apparatus of claim 9, wherein the controller, when controlling to display the shortcut numbers and their associated phonebook information, controls to group the obtained phone book information and last-digit numbers of their associated shortcut numbers.

17. The apparatus of claim 9, wherein the display and the input unit comprise a touch screen.

18. The apparatus of claim 11, wherein the controller is further configured such that if the mobile terminal has entered the shortcut mode, the controller controls to determine whether an input corresponding to digit from 0-9 on the dial pad has been input for a time period greater than or equal to a second prescribed threshold, and
if the input corresponding to the digit from 0-9 on the dial pad has been input for a time period greater than or equal to the second prescribed threshold, then the controller controls to initiate communication using the shortcut number associated with the input corresponding to the digit from 0-9 on the dial pad that has been input for a time greater than or equal to the second prescribed threshold.

19. The method of claim 3, further comprising:
if the mobile terminal has entered the shortcut mode, determining whether an input corresponding to digit from 0-9 on the dial pad has been input for a time period greater than or equal to a second prescribed threshold, and
if the input corresponding to the digit from 0-9 on the dial pad has been input for a time period greater than or equal to the second prescribed threshold, then initiating communication using the shortcut number associated with the input corresponding to the digit from 0-9 on the dial pad that has been input for a time greater than or equal to the second prescribed threshold.

20. The method of claim 3, wherein the input number used to determine whether the mobile terminal has entered the shortcut mode corresponds to the same input number used for searching the phone book for shortcut numbers that start with the input number.

* * * * *